R. DINSE.
CULTIVATOR.
APPLICATION FILED MAY 20, 1913.
1,086,905.
Patented Feb. 10, 1914.
3 SHEETS—SHEET 3.
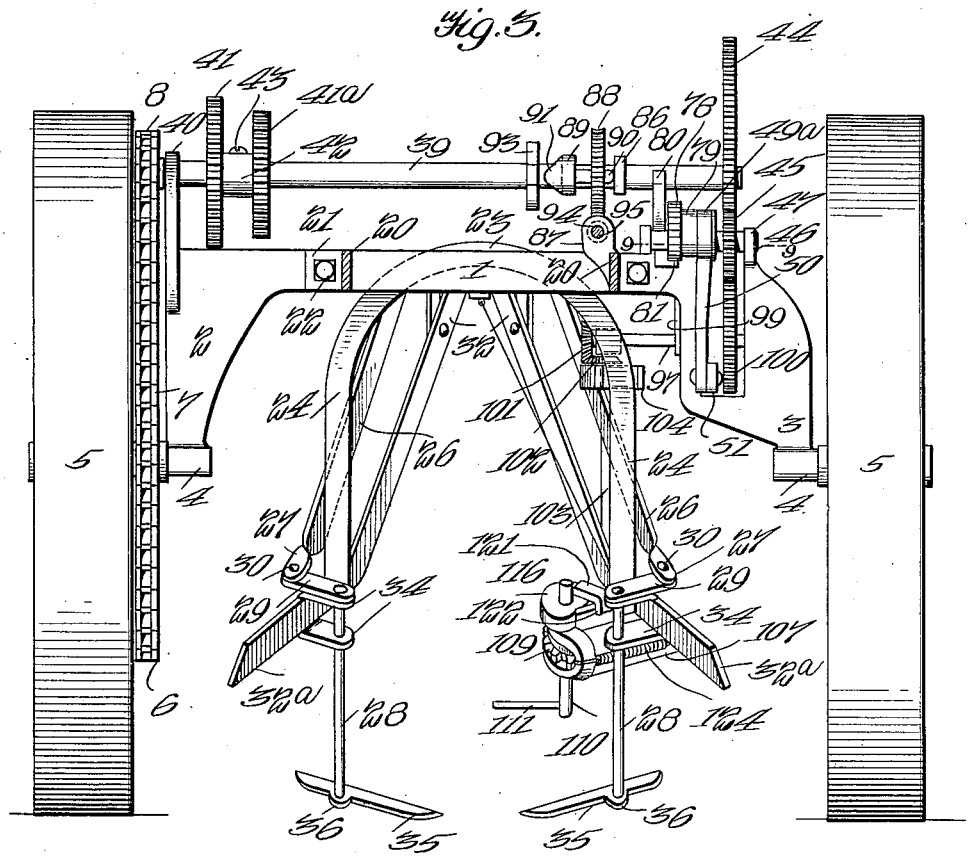
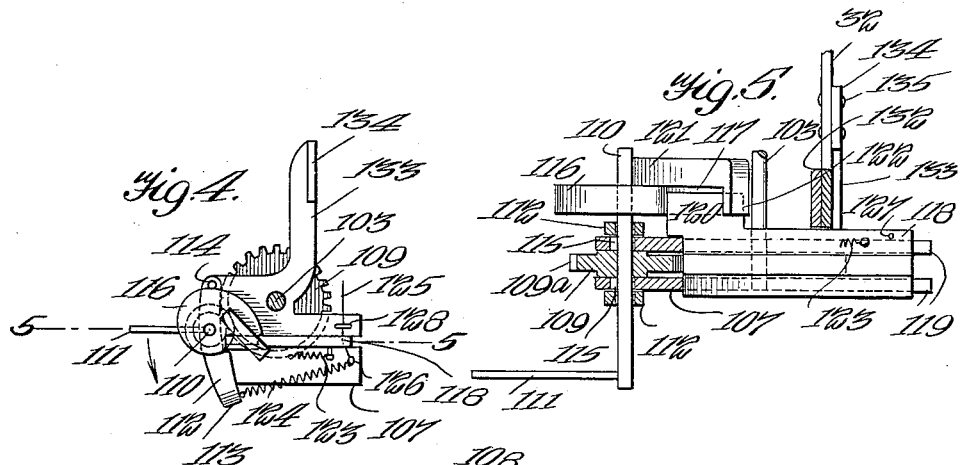
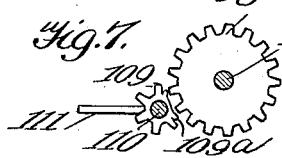
WITNESSES
E. M. Callaghan
C. E. Trainor
INVENTOR
RALPH DINSE,
BY Munn & Co.
ATTORNEYS

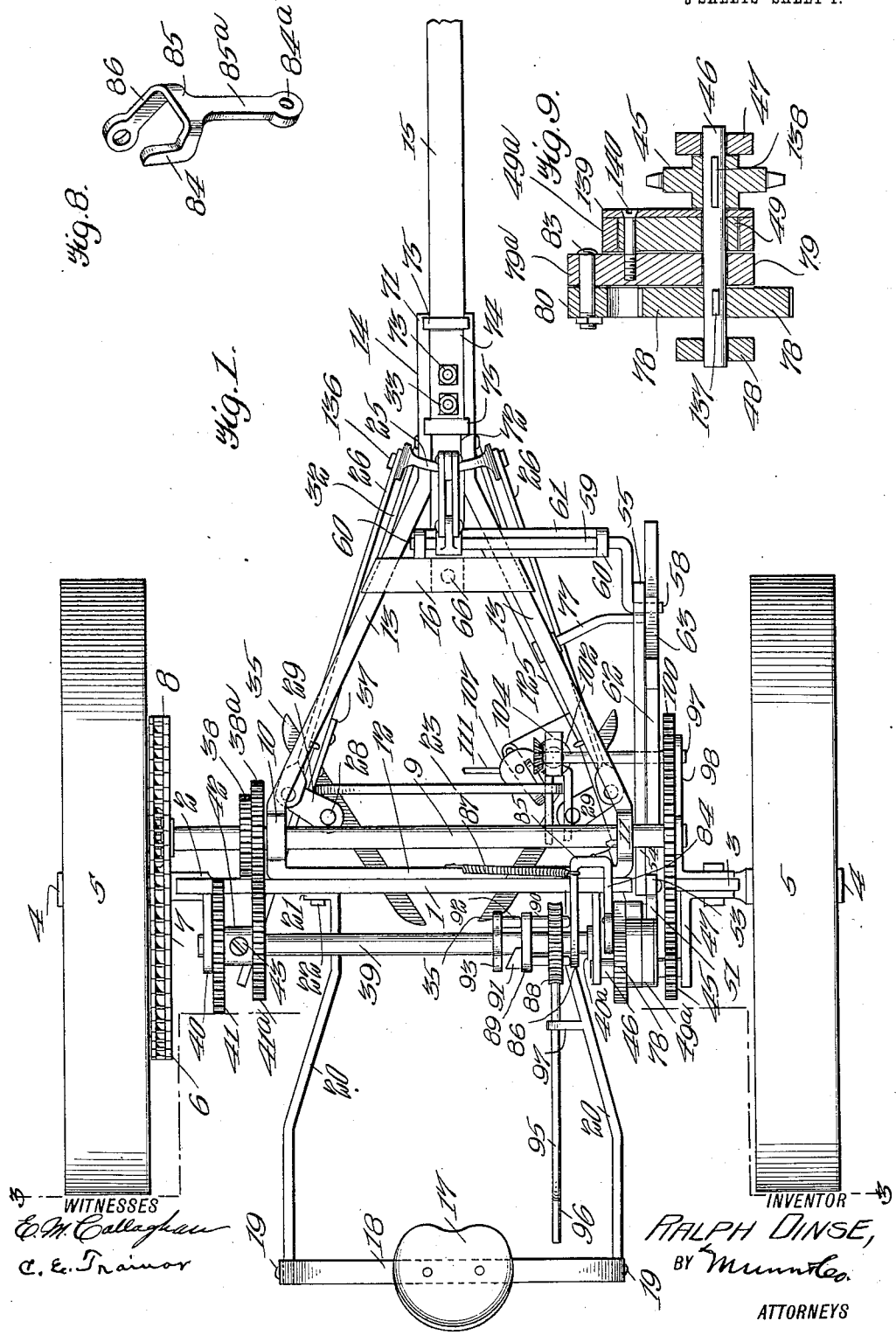

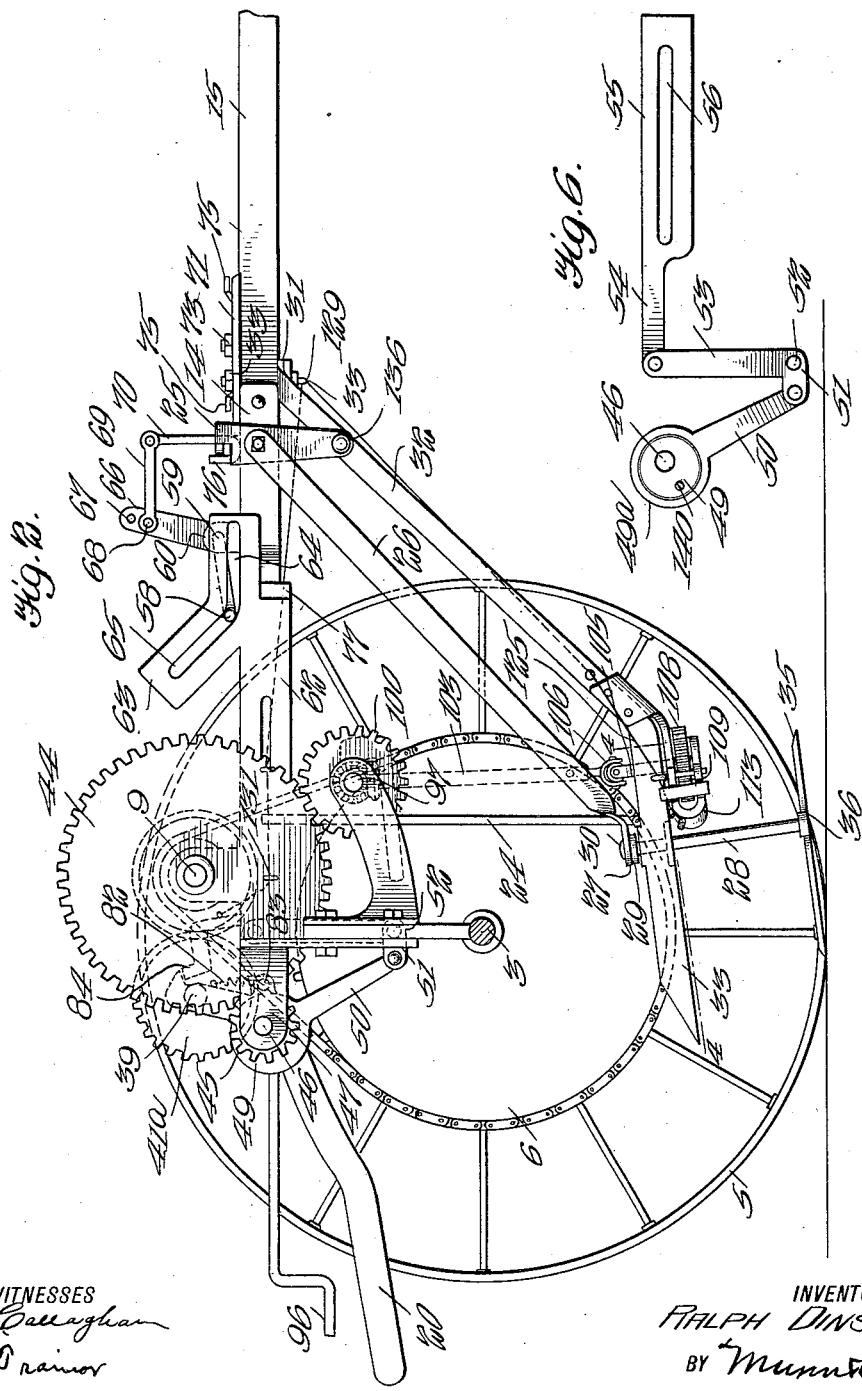

UNITED STATES PATENT OFFICE.

RALPH DINSE, OF TIPTON, IOWA.

CULTIVATOR.

1,086,905.

Specification of Letters Patent.

Patented Feb. 10, 1914.

Application filed May 20, 1913. Serial No. 768,756.

*To all whom it may concern:*

Be it known that I, RALPH DINSE, a citizen of the United States, and a resident of Tipton, in the county of Cedar and State of Iowa, have invented a new and useful Improvement in Cultivators, of which the following is a specification.

My invention is an improvement in cultivators, and has for its object to provide a device of the character specified, by means of which plants in rows may be cultivated on all sides, while the cultivator is moving longitudinally of the rows, thus dispensing with the necessity for hoeing or cultivating at right angles to the direction of the rows.

In the drawings:—Figure 1 is a plan view of the improved cultivator, Fig. 2 is a side view with the near wheel removed, Fig. 3 is a section on the line 3—3 of Fig. 1, Fig. 4 is a section on the line 4—4 of Fig. 2, Fig. 5 is a section on the line 5—5 of Fig. 4, Fig. 6 is a detail side view of the means for operating the cam plate, Fig. 7 is a top plan view of the gear wheels which connect the plant operated mechanism with the blades; Fig. 8 is a perspective view of the yoke, and Fig. 9 is a section on the line 9—9 of Fig. 3.

The present embodiment of the invention comprises a yoke or U-shaped frame consisting of a body 1, and depending arms 2 and 3, each of the said arms having an outwardly extending spindle 4 at its lower end, upon which is journaled a wheel 5. A sprocket wheel 6 is secured to the spindle on the arm 2, and a sprocket chain 7 connects the said sprocket wheel with a sprocket wheel 8 on the adjacent end of a shaft 9, supported in bearings 10 and 11, at the ends of a plate 12, secured to the front of the body of the yoke and extending forwardly and upwardly from the said body.

Each of the bearings 10 and 11 is provided with an integral forwardly and inwardly extending brace 13, and the front ends of the braces are bent to lie alongside each other in parallel relation as indicated at 14, in Fig. 1, and are lapped upon the opposite sides of a tongue 15, and are secured thereto in any suitable manner. The braces 13 are connected near their forward ends by a cross plate 16, and a seat 17 is connected to the body 18 of a substantially U-shaped plate, the arms 19 of the said plate being connected to the rear ends of brackets 20, whose forward ends are secured to the rear face of the body 1 of the yoke.

The inner ends of the brackets 20 are bent laterally to form angular lugs 21, which lap upon the rear face of the said body and are secured thereto by bolts 22 or the like. An arch bar comprising a body 23 and depending arms 24 is arranged in front of the shaft 9, and the cultivating mechanism is arranged at the lower ends of the said arms. A U-shaped bracket 25 is arranged at the junction of the braces 13, and the parallel portions 14 thereof, the body of the said bracket being above the portions 14, and the arms of the bracket depending upon each side of the tongue.

Inclined braces 26 are bolted at one end to the said arms, near their junction with the body of the bracket and the rear ends of the said braces are given a quarter turn as indicated at 27, and a vertical post or shaft 28 is connected with each of the said braces at this point, by means of arms 29 rigid with the post. One end of each arm is connected to the portion 27 of each brace by means of a rivet 30, and the upper end of the post or shaft is passed through the upper end of the arm.

A V-shaped hanger comprising a body 31 and arms 32 is connected with the tongue at the front ends of the portions 14 of the braces 13 by means of a bolt 33, the said bolt passing through the tongue and the body of the hanger. The arms 32 of the hanger extend rearwardly, diverging from each other, and the extremity of each arm is bent laterally outward as shown at 32$^a$ at an angle to the main portion. Each of the portions 33 is provided intermediate its ends with a pair of parallel laterally and inwardly extending lugs 34, and each of the said lugs is provided with an opening for receiving the adjacent post or shaft 28.

The arm 29, before mentioned, laps upon the uppermost lug of the adjacent lug of the hanger, and a cultivating blade 35 is supported at the lower end of each of the posts or shafts. Each of the said blades has its cutting edge forwardly and is provided at its rear edge with a bearing lug 36, for engaging the post. The said blades are arranged at an angle to each other, diverging toward their front ends, and the bearing lug 36 is nearer the front end than the rear end. The arms 24 of the arch bar, before mentioned, are provided with forwardly extending lugs 37, which lap upon the arms 32 of the hanger, and are secured thereto in any suitable manner.

The shaft 9, before mentioned, is provided at one end with a pair of gear wheels 38 and 38$^a$, the latter being of larger size and being on the inner side of the gear wheel 38. A shaft 39 is journaled in bearing arms 40 and 40$^a$, extending rearwardly from the body 1 of the yoke, and the said shaft is provided with gear wheels 41 and 41$^a$, for meshing with the gear wheels 38 and 38$^a$, before mentioned. A collar 42 is secured to the shaft 39 between the gear wheels 41 and 41$^a$ by means of a set screw 43, and the collar is secured to both gear wheels. By loosening the said screw the collar and the gear wheels may be shifted to cause the gear wheel 41$^a$ to engage with the gear wheel 38$^a$ or to cause the gear wheel 41 to engage with the gear wheel 38. Thus the relative speed of the shafts 9 and 39 may be varied.

A gear wheel 44 is secured to the shaft 9, at the opposite end from the sprocket wheel 8, and the said gear wheel meshes with a pinion 45, on a stub shaft 46, journaled in bearing arms 47 and 48, the former being secured to the arm 3 and the latter to the body of the yoke. An eccentric 49 is journaled on the shaft 46 and the eccentric is engaged by a ring or strap 49$^a$, and the said ring or strap is provided with a radial arm 50, connected at its outer end to one arm 51 of an elbow lever, pivoted at 52 in an opening in the adjacent arm 3 of the yoke, and the other arm 53 of the elbow lever is pivoted to the stem 54 of a slide bar, to be later described, (see Fig. 6).

The body 55 of the slide bar is slotted longitudinally as shown at 56, for receiving a crank arm 58, on a shaft 59, journaled in bearing lugs 60 on a plate 61, supported transversely of the adjacent brace bar 13, and secured to the said bar and to the cross plate 16, before mentioned. A cam plate 62 is arranged alongside the slide bar 55, the said plate having an extension 63, provided with an angular slot consisting of connected portions 64 and 65, meeting at an angle, and the crank arm 58 before mentioned, is engaged with the said angular slot.

An arm 66 is rigidly connected with the shaft 59, before mentioned, and one of a series of openings 67 in the outer end of the said arm is engaged by a pin or rivet 68, for connecting a pair of oppositely arranged links 69 to the said arm. The opposite end of the links are arranged on opposite sides of an arm 70, extending upwardly from one end of a slotted plate 71, mounted to slide on the rear end of the tongue. The plate is provided with a longitudinally extending slot 72, through which extends a bolt 73, and the bolt 33, before mentioned, and a guide plate 74 is arranged above the plate 71, and held in place by the said bolts.

The guide plate 74 is provided with an upwardly offset cross head 75, at each end and the ends of the cross head engage above the sides of the slot 72 of the plate, to guide the said plate in its movement on the tongue. The plate is provided with a lug 76 just behind the arm 70, and the body of the U-shaped bracket 25 engages between the said arm and the lug. It will be evident that when the shaft 61 is rocked or oscillated, the bracket 25, together with the slide plate 71, will be moved with respect to the tongue 15, the direction of motion depending upon the direction of oscillation of the shaft. The hanger 31—32 will also be moved forwardly or rearwardly, and since the arms 29 are rigid with the posts or shafts 28, the said posts or shafts will be oscillated to vary the inclination of the blades 35 with respect to each other. As long as the crank arm 58 moves in the portion 64 of the slot of the cam plate, the shaft 59 will not be affected. As soon however, as the crank arm engages the portion 65 of the angular slot, the shaft will be rocked to move the blades 35, as before mentioned.

When the shaft 46 is rotated, the elbow lever 51—53 will be rocked to cause the slide bar 55, to move longitudinally. The outer end of the said bar is giuded by an angular rod 77, rigidly connected with the adjacent brace 13. The outer end of the rod is bent perpendicular to the plate 55, and engages the slot 56, to support and guide the outer end of the said plate. The cam plate 62 is rigid with the slide bar 55, and moves therewith to cause the crank arm 58 to be operated by the slot 64—65.

The eccentric 49 is loose on the shaft 46, and is operated by means of a ratchet wheel 78, secured to the shaft 46, and a collar 79 is arranged on the shaft adjacent to the ratchet wheel. The said collar is provided with a radial lug 79$^a$, to which is pivoted a pawl arm 80, and the said pawl arm has a pawl or tooth 81, that coöperates with the ratchet wheel. The pawl arm has connected thereto one end of a coil spring 82, whose other end is connected to the pivot pin 83, which connects the pawl arm to the radial lug of the collar. The spring normally holds the pawl arm with the pawl in engagement with the ratchet wheel. As the shaft 46 rotates, however, the pawl arm will, under certain conditions to be later described, engage one of the arms 84 of a yoke, comprising a body 85, the arm 84 before mentioned, and an arm 86, whose free end is journaled on the shaft 39, before mentioned. The said arm is provided with a large bearing and is movable longitudinally of the shaft to bring the arm 84 into and out of position for engagement with the pawl arm to move the said arm to cause the pawl to be released by the ratchet wheel, whereby to move the eccentric strap 49ª, and the arm 50 connected therewith to swing the blades 35 from between the plants in the row. The yoke is provided with a depending arm 85ª pivoted on to the plate 12 at 84ª.

The yoke 84—85—86 is normally held with the arm 84 in position to engage the pawl arm by means of a coil spring 87, one end of the spring being connected to the arm 86 of the yoke and the other to the plate 12, before mentioned. A worm wheel 88 is arranged on the shaft 39, adjacent to the yoke, and a cross head 89 is arranged on the shaft adjacent to the worm wheel. The said cross head is provided at each end with a pin 90, and the pins pass through openings in the worm wheel. The said pins are arranged on opposite sides of the shaft 39, and their free ends are adapted to engage the arm 86 of the yoke to move the said yoke longitudinally of the shaft and to move the arm 84 out of position to engage the pawl arm.

The cross head 89 is provided with a cam 91, on the opposite face from the pins 90, and the cam is adapted for engagement with a pin 92 on one of the arms of a star wheel 93, secured to the shaft adjacent to the cross head. The star wheel is provided with a threaded opening in each of its arms and the pin 92 may be engaged with the opening of either arm. The said pin when it engages the cam of the cross head will move the cross head toward the worm wheel to cause the free ends of the arms 90 to engage the yoke, to move the same longitudinally of the shaft 39.

The wormwheel is engaged by a worm 94 on a worm shaft 95, provided at its rear end with a crank 96, and journaled in bearing lugs 97 on the adjacent bracket 20, before mentioned. The crank 96 is adjacent to the seat 17 and in convenient position for the operator to grasp the crank. By rotating the worm the cross head 89 may be also rotated to bring the pins 90 of the cross head out of position for engaging the yoke arm 86. When the said cross head is parallel with the axis of the yoke arm 86, the pins 90 will engage the said arm, while when the axis of the cross head is at right angles to the axis of the yoke arm, the pins will not engage the arm.

The blades 35 normally occupy a position to cut between the plants in the rows, and the said blades are swung out of such position at each plant, remaining out of position during their passage by the plant, but immediately swinging into position between the plants as soon as they have passed the said plants. When the plants are small and especially when the said plants are in rows at equal distances apart, the mechanism just described will perfectly cultivate the same, both alongside the row and between the plants in the row.

The operation is as follows:—

As the machine moves through the field with the blades 35 on each side of the row, the shaft 39 is rotated continuously through the sprocket chain 7, and the shaft 9. The relative speed of the shafts 9 and 39 may be varied as above described by shifting the wheels 41 and 41ª. At regular intervals, the star wheel moves the cross head longitudinally of the said shaft, and the pins of the cross head move the yoke 84—85—86 to cause the arm 84 to release the pawl arm. The stub shaft 46 is rotated continuously, and at regular intervals the eccentric 49 is operated as above described to swing the blades 35 from between the plants in the row. The said blades act somewhat in the same manner as the blades of a pair of scissors moving toward and from each other between the plants in the row. As the blades pass the plants their rear ends are separated to prevent injury to the plants. As soon as the blades pass the plants, they are swung inwardly toward each other to stir the ground and cut the weeds between the plants. Slight inequalities of spacing of the plants may be compensated for by means of the worm shaft 95, the operator moving the worm wheel to cause the pins 90 to engage or release the yoke at unequal periods. If for instance, a plant is spaced from the preceding plant, a lesser distance than the rule, the worm wheel may be operated to cause the blades to move apart quicker than they would otherwise do, whereby to prevent injury to the said plants. The succeeding plant will of course be farther apart, and the blades must be together for a longer period of time. This may also be regulated by the driver. When, however, the spacing is so unequal that it would require the constant attention of the driver and especially when the plants are large enough to offer sufficient resistance, a tripping mechanism is provided for engagement by the plants themselves to operate the blades. The tripping mechanism is so arranged that the movement of the blades is actuated solely by the said tripping mechanism and is not dependent on the operation of the cross head or the star wheel.

A stub shaft 97 is journaled in a bearing arm 98, extending forwardly from the adjacent arm 3 of the yoke 1—2—3, and in a bearing arm 99, connected with the adjacent inclined brace 13, and the said shaft is provided with a gear wheel 100, meshing with the gear wheel 44, on the shaft 9, before mentioned. At its inner end the shaft 97 is provided with a bevel gear wheel 101, meshing with a similar wheel 102, on a vertical shaft 103. The shaft 103 is supported at its upper end by a bearing in a collar 104, which engages the inner end of the shaft 97, and connects the upper end of the shaft 103 to the said shaft 97.

The lower end of the shaft 103 is connected to the upper end of a stub shaft 105, by means of a universal joint 106. The stub shaft is journaled in a U-shape bracket 107, connected to the adjacent hanger arm 32, and a gear wheel 108 is secured to the stub shaft in the bracket. The gear wheel meshes with a pinion 109, secured to a shaft 110, also journaled in the bracket 107. The lower end of the shaft 110 extends below the bracket 107, and is provided with a radial arm 111. The shaft 110 passes through openings in the arms 112 of a yoke comprising the said arms 112, and a body 113.

The arms of the yoke are pivoted at 114 to the bracket 107, and the bearing openings 115 for the shaft 110 in the bracket 107 are elongated as shown in Fig. 5, so that the said shaft may move away from the shaft 103. The gear wheel 109 is a mutilated gear, and the first tooth 109$^a$ thereof is of lesser length than the succeeding teeth. The second tooth of the said mutilated wheel is closer to the tooth 109$^a$ than the succeeding teeth, the arrangement being such that when the mutilated gear first engages the gear wheel 108, the said tooth 109$^a$ may center or engage the teeth of the gear wheel 108 end to end, without interlocking, that is, may permit the said gear wheels to pass without intermeshing.

The second tooth of the gear wheel 109 however, will not center or engage end to end the succeeding tooth of the gear wheel 108 on account of its closer spacing, but will mesh with the said tooth to cause the gear wheels to intermesh. A cam 116 is secured to the shaft 110 above the bracket 107, and a radial shoulder 117 is formed at the periphery of the said cam between the point of greatest and the point of least eccentricity. A slide 118 is mounted for radial sliding movement toward and from the shaft 110, the said slide moving in guides 119 in the bracket, and the slide is provided with an extension 120, whose end engages the periphery of the cam and whose side is adapted to engage the shoulder 117 of the cam.

An arm 121 is secured to the upper face of the cam wheel, the said arm extending beyond the shoulder 117 and having a depending lug 122, opposite the said shoulder. The slide is normally pressed toward the shaft 110 by a coil spring 123, and a similar spring 124, is arranged between the body 113 of the yoke and the bracket 107. A cord or wire 125 has one of its ends connected to the bracket as shown at 126, and the said cord passes through an opening 127 in the slide and through an eye 128, on the bracket, on the opposite side of the slide from the connection of the cord with the bracket. The said cord passes forwardly and upwardly through an eye 129 at the body of the hanger 31—32 and then rearwardly through guide eyes 130 and 131, on one of the braces 13, to a connection with the body 85, of the yoke 84—85—86. The arrangement is such that when the slide 118 is moved away from the shaft 110, the said slide will make traction on the cord in a direction to move the yoke in the same direction as the said yoke is moved by the pins of the cross head. The spring 124 normally holds the shaft 110 with the gear wheels 109—108 in mesh, but the said spring will permit the yoke to yield to permit the shaft 110 to move away from the shaft 103, under certain conditions to be later mentioned.

The operation of the mechanism just described is as follows:—When the arm 111 on the shaft 110 engages a plant the shaft 110 will be rotated in the direction of the arrow in Fig. 4. The cam wheel 116 will gradually move the slide 118 away from the shaft 110 to make traction on the cord 125 in a direction to move the yoke 84—85—86 out of position for engaging the pawl arm. The shaft 46 will thus operate the hanger 31—32 to swing the blades 35 in between the plants in the row. The shaft 110 will be rotated until the extension 120 of the slide passes over the point of greatest eccentricity when the spring 123 will immediately move the slide into the position of Fig. 5, thus locking the shaft from further rotation until the arm 111 engages the succeeding plant. Thus the swinging mechanism for opening the knives or blades 35 to prevent them cutting the plants in the rows is operated by the plants themselves and no matter what may be the spacing of the plants, the blades will be swung out from between the plants in the row only when the arm 111 engages a plant.

It will be noted from an inspection of Figs. 4 and 5, that the bracket 107 is provided with a lateral extension 103, which laps beneath the adjacent arm 32 of the hanger 31—32, and the said extension is provided with an upwardly extending lug 134, which laps upon the said arm 32, and is secured thereto by means of rivets 135 or the like. Each of the arms 24 of the arch bar is provided with a forwardly extending lug 132, which laps upon the adjacent arm 32 of the hanger and is secured thereto in any suitable manner. The arch bar thus properly spaces the said arms 32, and rigidly connects them while at the same time it offers no resistance to the passage of the plants. The ratchet wheel 78 is keyed to the shaft 46 by means of the key 137, and the pinion 45 is keyed to the said shaft by a key 138. The eccentric 49 and the collar 79 are journaled loosely on the shaft 46. An eccentric washer 139 is also arranged on the shaft between the eccentric wheel and the pinion 45, the said washer being of sufficient diameter to lap over the strap 49ª, and the washer is secured to the collar 79 and the eccentric 49, by means of a screw 140. The said screw passes through the washer 139, and through an opening in the eccentric 49, and engages a threaded opening in the collar. The head of the screw is countersunk in the washer. The arms of the U-shaped bracket 25 are pivoted to the arms 32 of the hanger 31—32, as indicated at 136, and the said bracket swings on the said pivotal connection. When the shaft 59 is oscillated, to move the bracket, the body portion thereof may move vertically with respect to the arm 70 and lug 76. It will be noted that the said body is curved transversely of the tongue, and fits between the arm and the lug. The arrangement thus permits the said body to move vertically with respect to the sliding plate 71 without becoming disconnected.

I claim:—

1. A cultivator comprising a yoke consisting of a body and depending arms at the ends thereof, each arm having an outwardly extending journal pin, wheels journaled on the journal pins, a shaft journaled in front of the body of the yoke, a shaft journaled in rear of the body of the yoke, said shafts being parallel with the spindles, a driving connection between the first-named shaft and one of the wheels, a variable driving connection between the shafts, a tongue connected with the body of the yoke and extending forwardly therefrom, a substantially U-shaped bracket mounted to slide on the tongue, a substantially V-shaped hanger connected with the tongue and extending rearwardly and downwardly therefrom, a vertical post journaled in each arm of the hanger at the rear thereof, a cutting blade at the lower end of each post and arranged to cut horizontally, a crank arm connected with the upper end of each post, a link connecting each crank arm with the U-shaped bracket, means for shifting the said bracket longitudinally, said means comprising a rock shaft having an arm connected with the bracket and having a crank at one end, a longitudinally movable plate having an angular slot for engagement by the crank arm to oscillate the shaft, a stub shaft journaled parallel with the first-named shafts, an eccentric journaled loosely on the stub shaft, a strap on the eccentric provided with a radial arm connected with a cam plate for moving the same, a collar on the eccentric and provided with a radial lug, a pawl arm pivoted to the lug and provided with a tooth, a ratchet wheel secured on the shaft and engaging the tooth, a spring connected with the arm and normally holding the tooth in engagement with the ratchet wheel, a yoke having one end slidable on the second shaft and having the other arm in position to engage the pawl arm to release the ratchet wheel, a driving connection between the ported at the lower end of each shaft, said yoke being movable into and out of engaging position, and means on the second shaft for moving the yoke at regular intervals.

2. A cultivator comprising a wheel supported frame, a tongue extending forwardly from the frame, an arch bar adjacent to the frame, a hanger comprising a body secured to the tongue and arms connected at their rear ends to the ends of the arch bar, a vertical shaft journaled at the rear end of each arm of the hanger, a cultivating blade supported at the lower end of each shaft, said blades normally converging toward their rear ends, a common means for oscillating the shafts to move the rear ends of the blades apart, and means for actuating the said common means at predetermined intervals, said oscillating means comprising a substantially U-shaped bracket mounted to slide on the tongue, a radial arm on each shaft, and a link connecting each arm to the bracket, said actuating means comprising a longitudinally movable slide bar, a connection between the bar and the bracket for moving the said bracket when the bar is moved longitudinally, a stub shaft, an eccentric on the stub shaft, a strap encircling the eccentric and having a radial arm connected with the slide bar, normally active means for preventing movement of the eccentric with the stub shaft, and means for releasing the said preventing means at predetermined intervals.

3. A cultivator comprising a wheel supported frame, a tongue extending forwardly from the frame, an arch bar adjacent to the frame, a hanger comprising a body secured to the tongue and arms connected at their rear ends to the ends of the arch bar, a vertical shaft journaled at the rear end of each arm of the hanger, a cultivating blade supported at the lower end of each shaft, said blades normally converging toward their rear ends, a common means for oscillating the shafts to move the rear ends of the blades apart, and means for actuating the said common means at predetermined intervals, said oscillating means comprising a substantially U-shaped bracket mounted to slide on the tongue, a radial arm on each shaft, and a link connecting each arm to the bracket.

4. A cultivator comprising a wheel supported frame, a tongue extending forwardly from the frame, an arch bar adjacent to the frame, a hanger comprising a body secured to the tongue and arms connected at their rear ends to the ends of the arch bar, a vertical shaft journaled at the rear end of each arm of the hanger, a cultivating blade supported at the lower end of each shaft, said blades normally converging toward their rear ends, a common means for oscillating the shafts to move the rear ends of the blades apart, and means for actuating the said common means at predetermined intervals.

5. A cultivator comprising a wheel supported main frame, a tongue extending forwardly therefrom, a hanger comprising a body connected with the tongue and rearwardly and downwardly extending arms diverging from each other, a vertical shaft journaled on each arm near the rear end thereof, a blade in connection with each shaft, said blades normally converging toward one end to cut between the plants in the row, a crank arm connected with each shaft, a common means connected with the crank arm for simultaneously oscillating the shafts to move the adjacent ends of the blades apart, and means on the frame for engagement by the plants to actuate the said common means, said last-named means comprising a shaft journaled in vertical position adjacent to one of the vertical shafts, and having a driving connection with the wheels of the frame, a second shaft journaled adjacent to the first-named shaft and movable laterally toward and from the said first-named shaft, said last-named shaft having a radial arm for engagement by the plants in the row to oscillate the shaft, a slide movable toward and from the last-named shaft, a cam on the last-named shaft for moving the slide away from the said shaft, a spring pressing the slide toward the said shaft, means on the frame for actuating the common oscillating means for the blade carrying shafts, a normally active means for connecting the said actuating means with the wheels, means for restraining the action of the said connecting means, and means operated by the slide as it moves away from the last-named shafts for releasing the restraining means.

6. A cultivator comprising a wheel supported main frame, a tongue extending forwardly therefrom, a hanger comprising a body connected with the tongue and rearwardly and downwardly extending arms diverging from each other, a vertical shaft journaled on each arm near the rear end thereof, a blade in connection with each shaft, said blades normally converging toward one end to cut between the plants in the row, a crank arm connected with each shaft, a common means connected with the crank arms for simultaneously oscillating the shafts to move the adjacent ends of the blades apart, means operated by the wheels for operating the said oscillating means, a shaft journaled in vertical position adjacent to one of the blades and having a radial arm for engagement by the plants to rotate the said shaft, and a connection between the said shaft and the means for operating the oscillating means for controlling the action of the said means.

7. A cultivator comprising a wheel supported main frame, a tongue extending forwardly therefrom, a hanger comprising a body connected with the tongue and rearwardly and downwardly extending arms diverging from each other, a vertical shaft journaled on each arm near the rear end thereof, a blade in connection with each shaft, said blades normally converging toward one end to cut between the plants in the row, a crank arm connected with each shaft, a common means connected with the crank arms for simultaneously oscillating the shafts to move the adjacent ends of the blades apart, and means on the frame for engagement by the plants to actuate the said common means, said last-named means comprising a rotatable shaft arranged adjacent to the blades and having a radial arm for engagement by the plants to rotate the shaft, and a connection between the said last-named shafts and the common oscillating means for controlling the said oscillating means.

8. A cultivator comprising a wheel supported main frame, a tongue extending forwardly therefrom, a hanger comprising a body connected with the tongue and rearwardly and downwardly extending arms diverging from each other, a vertical shaft journaled on each arm near the rear end thereof, a blade in connection with each shaft, said blades normally converging toward one end to cut between the plants in the row, a crank arm connected with each shaft, a common means connected with the crank arms for simultaneously oscillating the shafts to move the adjacent ends of the blades apart, and means on the frame for engagement by the plants to actuate the said common means.

9. In a cultivator, a wheel supported frame, a pair of vertical shafts arranged in spaced relation below the frame and supported thereby, a cutting blade arranged transversely of each shaft, means for normally holding the shafts with the blades converging at one end whereby to cultivate the soil between the shafts, means for simultaneously oscillating the shafts to swing the converging ends of the blades away from each other, means operated by the wheels of the frame for operating the said oscillating means at regular intervals, and manually controlled means for advancing or retarding the operation of the said operating means.

10. In a cultivator, a wheel supported frame, a pair of vertical shafts arranged in spaced relation below the frame and supported thereby, a cutting blade arranged transversely of each shaft, means for normally holding the shafts with the blades converging at one end whereby to cultivate the soil between the shafts, means for simultaneously oscillating the shafts to swing the converging ends of the blades away from each other, a shaft journaled adjacent to one of the blades and having a radial arm extending between the blades for engagement by the plants to rotate the shaft, a second shaft parallel with the last-named shaft, a connection between the said second shaft and the oscillating means for controlling the operation of the same, a driving connection between the shafts, means for checking the movement of the plant operated shaft at the end of each complete rotation, and means in connection with the said shafts for disconnecting the said shafts at the end of each complete rotation.

11. In a cultivator, a wheel supported frame, a pair of vertical shafts arranged in spaced relation below the frame and supported thereby, a cutting blade arranged transversely of each shaft, means for normally holding the shafts with the blades converging at one end whereby to cultivate the soil between the shafts, means for simultaneously oscillating the shafts to swing the converging ends of the blades away from each other, a shaft journaled adjacent to one of the blades and having a radial arm extending between the blades for engagement by the plants to rotate the shaft, a second shaft parallel with the last-named shaft, a connection between the said second shaft and the oscillating means for controlling the operation of the same, a driving connection between the shafts, and means in connection with the said shafts for disconnecting the said shafts at the end of each complete rotation.

12. In a cultivator, a wheel supported frame, a pair of vertical shafts arranged in spaced relation below the frame and supported thereby, a cutting blade arranged transversely of each shaft, means for normally holding the shafts with the blades converging at one end whereby to cultivate the soil between the shafts, means for simultaneously oscillating the shafts to swing the converging ends of the blades away from each other, a shaft journaled adjacent to one of the blades and having a radial arm extending between the blades for engagement by the plants to rotate the shaft, and a connection between the said shaft and the oscillating means for controlling the operation of the said means.

13. In a cultivator, a wheel supported frame, a pair of cutting blades supported below the frame with their rear ends adjacent and diverging toward their front ends, means for normally holding the said blades in the said position, a common means for swinging the rear ends of the blades away from each other, and means adapted for engagement by the plants for controlling the said swinging means of the blades.

14. In a cultivator, a wheel supported frame, a pair of cutting blades supported below the frame with their rear ends adjacent and diverging toward their front ends, means for normally holding the said blades in the said position, a common means for swinging the rear ends of the blades away from each other, means operated by the wheel for actuating the said common means at predetermined intervals, and manually controlled means for advancing or retarding the operation of the said actuating means.

15. In a cultivator, a pair of cutting blades arranged with their rear ends adjacent and diverging toward their front ends and supported for horizontal cutting action, means for normally holding the blades in the said position, and means adapted to be engaged by the plants in the row for swinging the said blades to move their rear ends in opposite directions.

16. In a cultivator, cultivating mechanism comprising a pair of pivotally mounted blades arranged to swing in a horizontal plane, means for normally holding the said blades converging toward their rear ends, and means adapted for engagement by the plants in the row to swing the rear ends of the blade away from each other.

RALPH DINSE.

Witnesses:
HARRY E. GIBEAUT,
WALTER SPRY.

Copies of this patent may be obtained for five cents each, by addressing the "Commissioner of Patents, Washington, D. C."